US010793060B2

(12) United States Patent
Gutierrez

(10) Patent No.: US 10,793,060 B2
(45) Date of Patent: Oct. 6, 2020

(54) COWL COVER LIGHT MOUNT ASSEMBLY

(71) Applicant: Lund Motion Products, Inc., Buford, GA (US)

(72) Inventor: Carlos Gutierrez, Norwalk, CA (US)

(73) Assignee: Lund Motion Products, Inc., Ann Arbor, MI (US)

( * ) Notice: Subject to any disclaimer, the term of this patent is extended or adjusted under 35 U.S.C. 154(b) by 0 days.

(21) Appl. No.: 16/573,553

(22) Filed: Sep. 17, 2019

(65) Prior Publication Data
US 2020/0130564 A1     Apr. 30, 2020

Related U.S. Application Data

(60) Provisional application No. 62/793,538, filed on Jan. 17, 2019, provisional application No. 62/751,453, filed on Oct. 26, 2018.

(51) Int. Cl.
*B60Q 1/24* (2006.01)
*B60Q 1/00* (2006.01)
*F21S 41/55* (2018.01)

(52) U.S. Cl.
CPC .............. *B60Q 1/24* (2013.01); *B60Q 1/0035* (2013.01); *F21S 41/55* (2018.01)

(58) Field of Classification Search
CPC .......... B60Q 1/24; B60Q 1/0035; F21S 41/55
USPC ....................................................... 362/422
See application file for complete search history.

(56) References Cited

U.S. PATENT DOCUMENTS

| | | | | |
|---|---|---|---|---|
| 1,674,340 A | * | 6/1928 | Nock | B60Q 1/06 362/503 |
| 2,120,619 A | * | 6/1938 | Matthiesen | B60Q 3/53 248/205.1 |
| 3,451,035 A | * | 6/1969 | Baldwin | B60Q 1/2615 439/117 |
| 3,474,381 A | * | 10/1969 | Baldwin | B60Q 1/2615 439/36 |
| 5,306,156 A | * | 4/1994 | Gibbs | B60Q 1/302 224/315 |
| 5,599,086 A | * | 2/1997 | Dutta | B60Q 3/53 296/214 |
| 7,097,225 B2 | * | 8/2006 | Huisingh | B60R 7/04 296/37.7 |
| 7,460,187 B2 | * | 12/2008 | Schedivy | B60R 11/02 348/837 |

(Continued)

*Primary Examiner* — Bryon T Gyllstrom
(74) *Attorney, Agent, or Firm* — Knobbe Martens Olson & Bear, LLP

(57) ABSTRACT

Disclosed herein are embodiments of a light mount assembly for use with a vehicle, a vehicle with a light mount assembly, and methods for using a light mount assembly on a vehicle. The vehicle can have a foldable windshield with a raised position and a lowered position, and the light mount assembly can have a light with a light mount and a support defining a track for the light. The support can be mounted on the vehicle using pre-existing holes in the vehicle such that a base portion of the light mount is spaced from an outer surface of the vehicle. The light can be repositioned and reoriented relative to the vehicle and/or the support. The light can be moved from a position above a top surface of the vehicle to another position to a side of the vehicle in order to prevent the light from interfering with the foldable windshield when the windshield is moved to the lowered position.

26 Claims, 9 Drawing Sheets

(56) References Cited

U.S. PATENT DOCUMENTS

| | | | |
|---|---|---|---|
| 7,674,010 B2 * | 3/2010 | Griffiths | F21V 11/10 362/240 |
| 9,923,341 B1 * | 3/2018 | Andersson | H01R 25/142 |
| D845,244 S * | 4/2019 | Andersson | D13/139.2 |
| 2008/0148515 A1 * | 6/2008 | Petelka | B60J 5/065 16/87.4 R |
| 2008/0273342 A1 * | 11/2008 | Kim | B61B 5/02 362/459 |

* cited by examiner

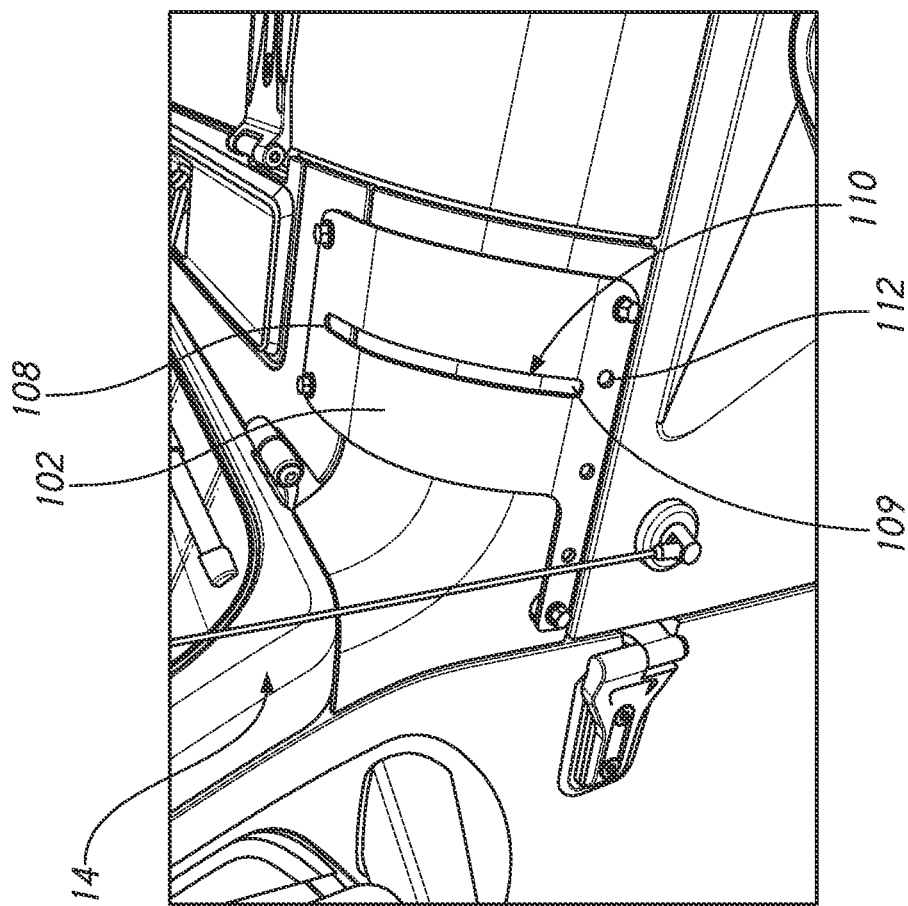
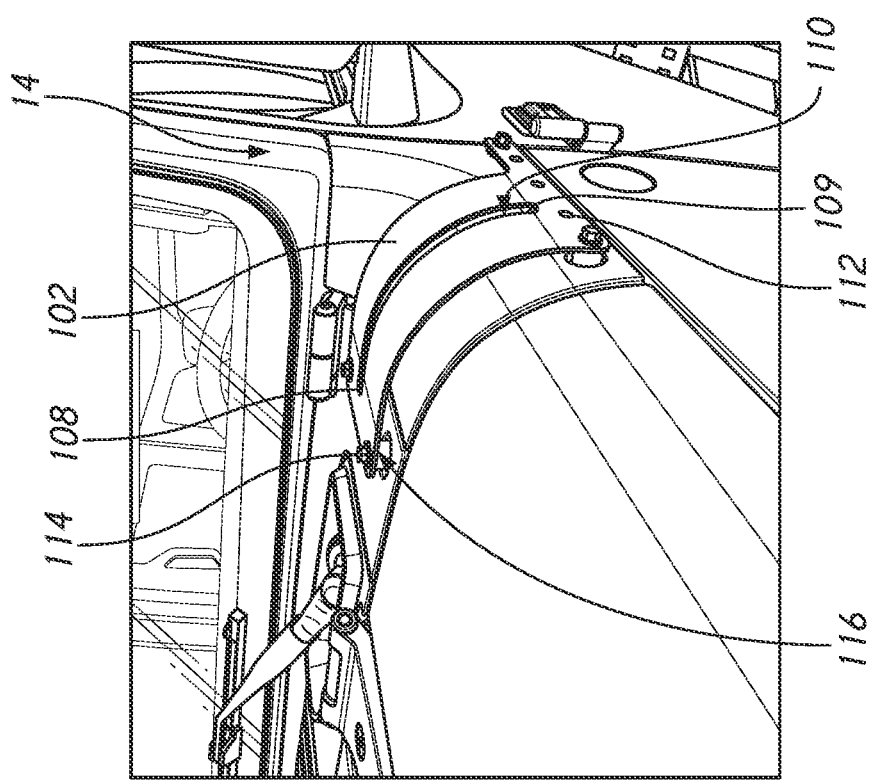
FIG. 4B
FIG. 4A

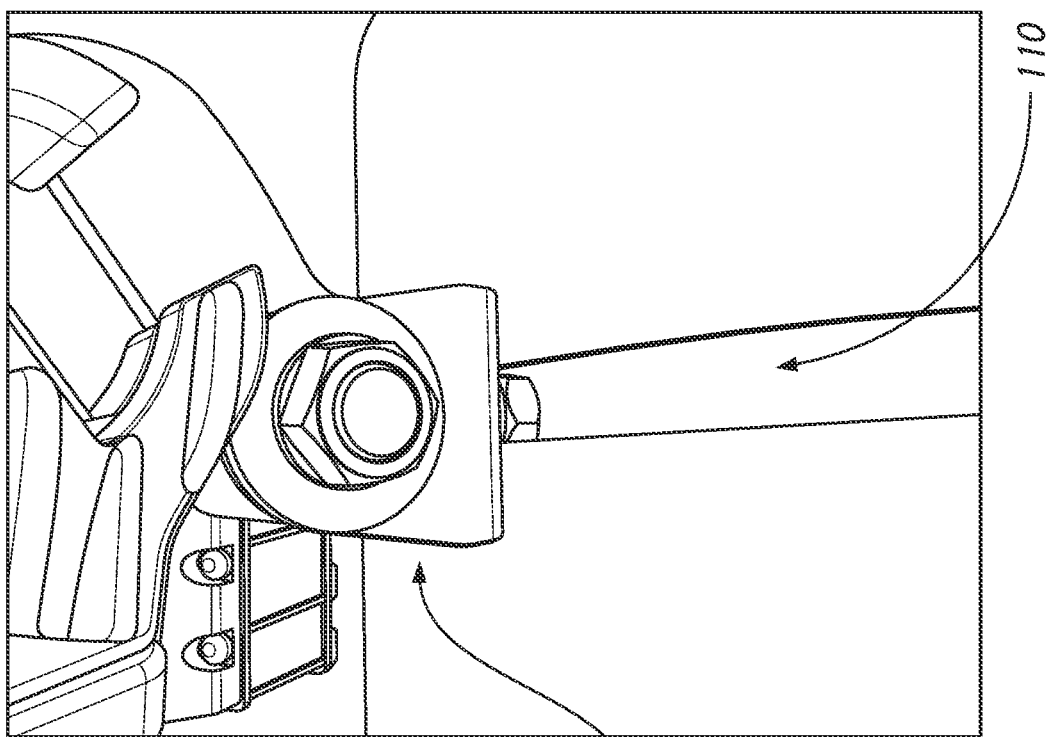
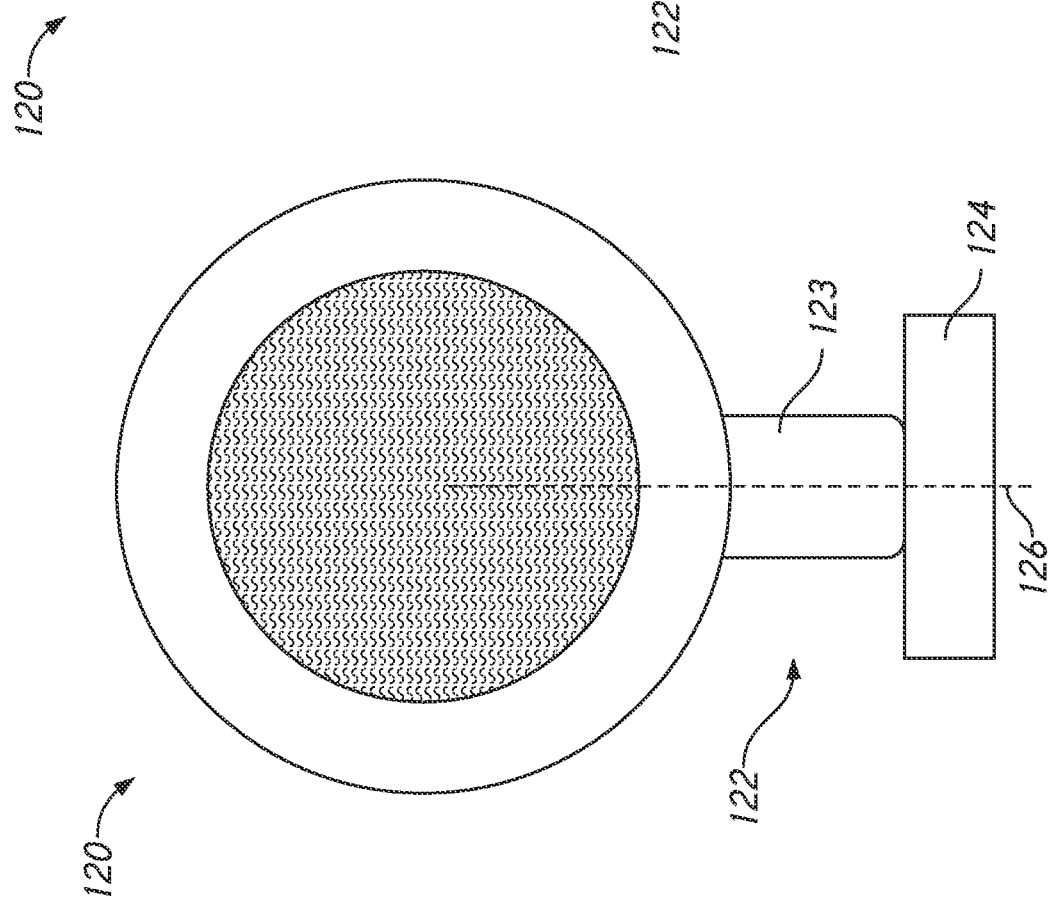
FIG. 5A
FIG. 5B

COWL COVER LIGHT MOUNT ASSEMBLY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is generally related to vehicle light mounts and related methods.

Description of the Related Art

Cowl covers are configured to protect the space or panel between the hood and windshield of the vehicle. The typical vehicle light mount assembly can mount a light in a relatively fixed position on a vehicle.

SUMMARY

Disclosed herein are embodiments of a vehicle having a hood, a windshield, and a light mount assembly, the light mount assembly comprising a light having a light mount with an upper portion and a base portion, a support defining a track, the support having an inner surface and an outer surface, the light being coupled to the track, and wherein the support is mounted on the vehicle such that the base portion of the light mount is spaced from an outer surface of the vehicle.

Also disclosed herein are embodiments of a light mount assembly comprising a light having a light mount defining an axis, an upper portion, and a base portion, a support defining a track with a first end and a second end and having an inner surface and an outer surface, the support being configured to attach to an outer surface of a vehicle such that the base portion of the light mount is spaced from the outer surface of the vehicle, and wherein when the light is coupled to the track, the light mount and the track cooperate to permit the light to move relative to the support between the first end and the second end of the track.

Also disclosed herein are embodiments of a light mount assembly comprising a support defining a track and having an inner surface, an outer surface, and a plurality of apertures, wherein the support is configured to be mounted on a vehicle, wherein a portion of the support is configured to be spaced from an outer surface of the vehicle.

In some embodiments, the vehicle can have pre-existing holes on a portion of the vehicle between the hood and the windshield. In some embodiments, the support can have apertures aligning with the pre-existing holes on the vehicle.

In some embodiments, fasteners can secure the support to the outer surface of the vehicle. The fasteners can extend through the apertures in the support and into the pre-existing holes on the vehicle.

In some embodiments, there is a cushioning layer between the support and the outer surface of the vehicle.

In some embodiments, the track can define a first end above a top surface of the vehicle and a second end to a side of the vehicle.

In some embodiments, the light mount and the track can cooperate to permit the light to move relative to the support between the first end and the second end of the track.

In some embodiments, the windshield of the vehicle is foldable. The windshield can have a raised position and a lowered position. The track can define a first location under the lowered position of the windshield and a second location spaced to the side of the lowered position of the windshield. In some embodiments, the first location and the second location are disposed between the first and the second ends of the track.

In some embodiments, the light mount can slide within the track.

In some embodiments, the support can have an aperture. The aperture can be configured to engage an additional light. In some embodiments, the additional light is coupled to the aperture. The light and the additional light can be adjustable relative to the support.

In some embodiments, the support can contact the outer surface of the vehicle. In some embodiments, the support can comprise a resilient material.

In some embodiments, the inner surface of the support can face in a first direction towards the outer surface of the vehicle and the outer surface of the support can face in a second direction opposite the first direction.

In some embodiments, the support can conform to a curvature of the vehicle.

In some embodiments, the axis of the light mount can be transverse to a first portion of the support defining a first position and transverse to a second portion of the support defining a second position. The axis in the first position can be transverse to the axis in the second position.

In some embodiments, the first end of the track can be configured to be positioned above a hood of the vehicle and the second end of the track can be configured to be positioned to a side of the hood of the vehicle.

In some embodiments, the support can comprise a plurality of apertures configured to align with pre-existing holes on the vehicle between a hood and a windshield of the vehicle.

In some embodiments, fasteners can be configured to secure the support to the outer surface of the vehicle. The fasteners can be configured to extend through the plurality of apertures in the support and into pre-existing holes on the vehicle.

In some embodiments, the track can be configured to define a first location under a lowered position of a windshield of the vehicle and a second location spaced to a side of the lowered position of the windshield.

In some embodiments, an additional light can be coupled to and rotatable within an aperture in the support.

In some embodiments, the support can be configured to contact the outer surface of the vehicle. In some embodiments, the support can comprise a resilient material.

In some embodiments, the inner surface of the support can be configured to face in a first direction towards the outer surface of the vehicle and the outer surface of the support can be configured to face in a second direction opposite the first direction.

In some embodiments, the support can be configured to conform to a curvature of the vehicle.

In some embodiments, the light is configured to rotate relative to the support.

In some embodiments, each of the track and the plurality of apertures can be configured to engage a light.

In some embodiments, at least some of the plurality of apertures in the support can be configured to align with a plurality of pre-existing holes on the vehicle. In some embodiments, the plurality of apertures in the support can be the substantially the same shape and size as the plurality of pre-existing holes on the vehicle.

BRIEF DESCRIPTION OF THE DRAWINGS

These and other features and advantages of the present devices, systems, and methods will become appreciated as the same becomes better understood with reference to the specification, claims and appended drawings wherein:

FIGS. 4A and 4B show perspective and side views of the support of FIGS. 3A-3C mounted on a vehicle;

FIGS. 5A and 5B show embodiments of a light with a light mount;

DETAILED DESCRIPTION

The detailed description set forth below in connection with the appended drawings is intended as a description of the presently preferred embodiments of light mount assemblies provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
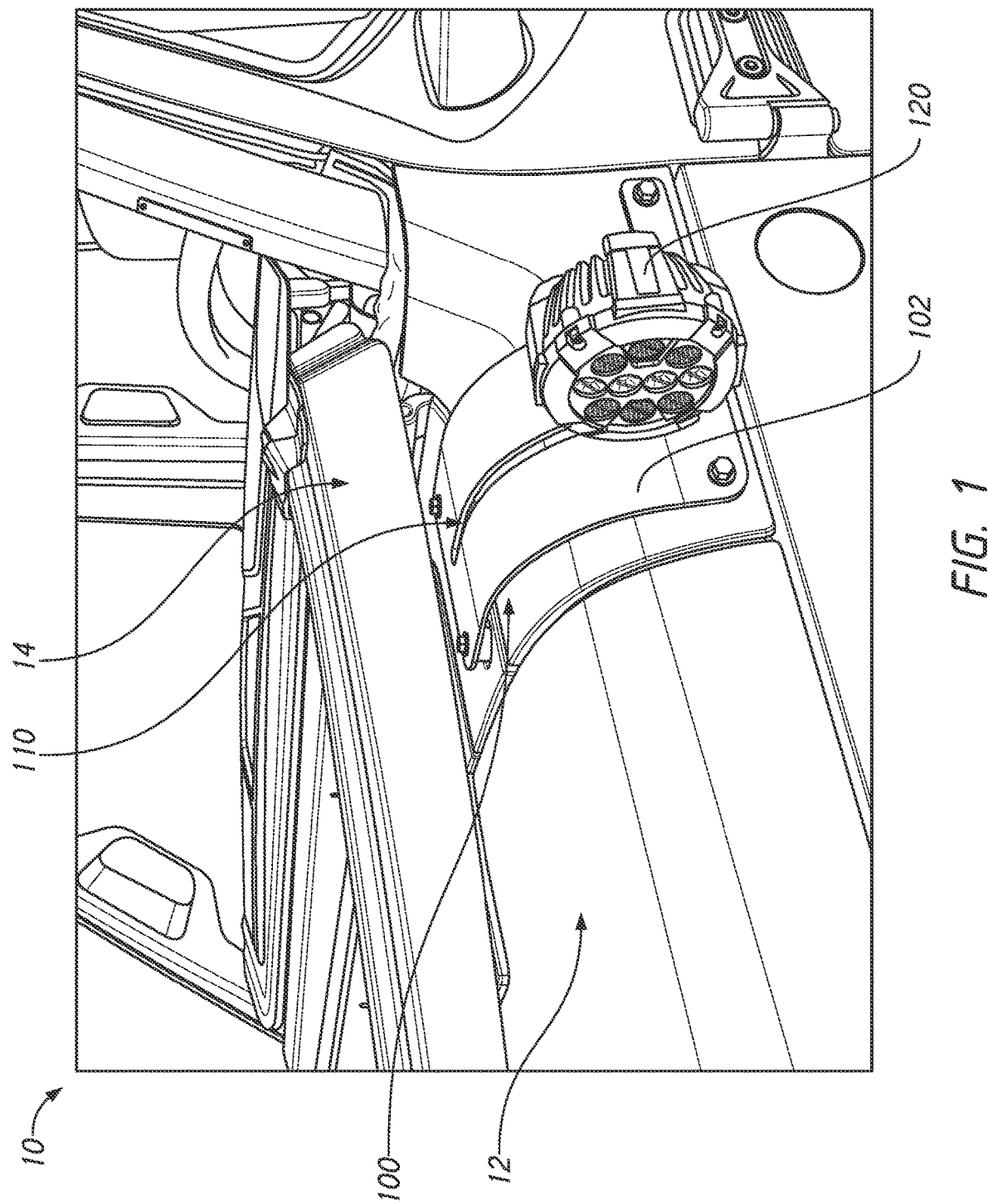
FIG. 1 shows a perspective view of an embodiment of a light mount assembly mounted on a vehicle with a foldable windshield.
Figure 2B:
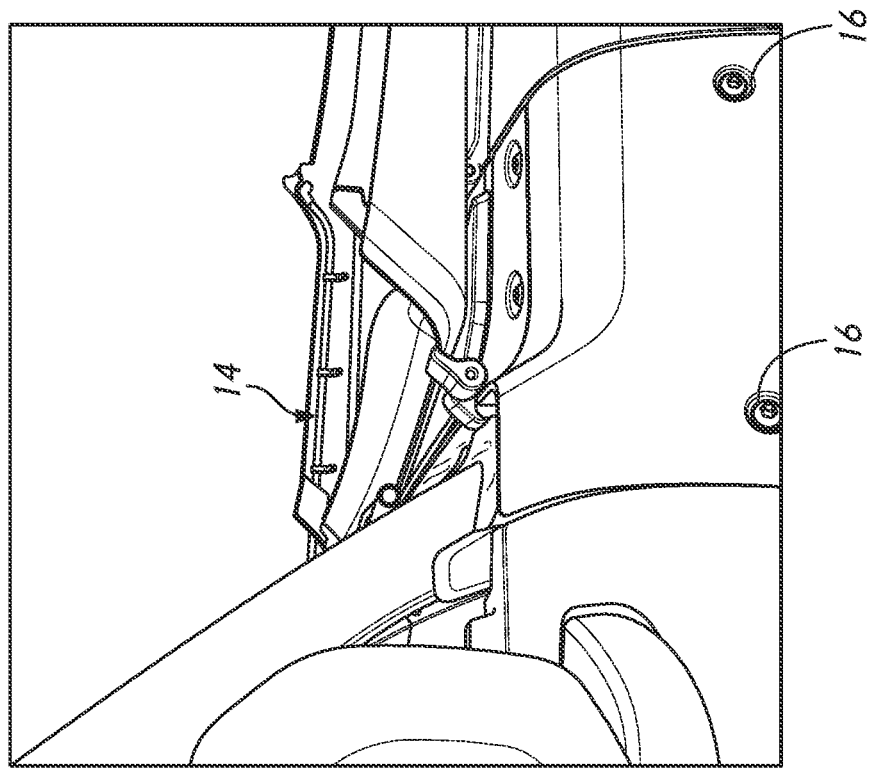
FIGS. 2A and 2B show perspective and side views an embodiment of a vehicle that can be configured to engage the light mount assembly of FIG. 1.
Figure 2A:
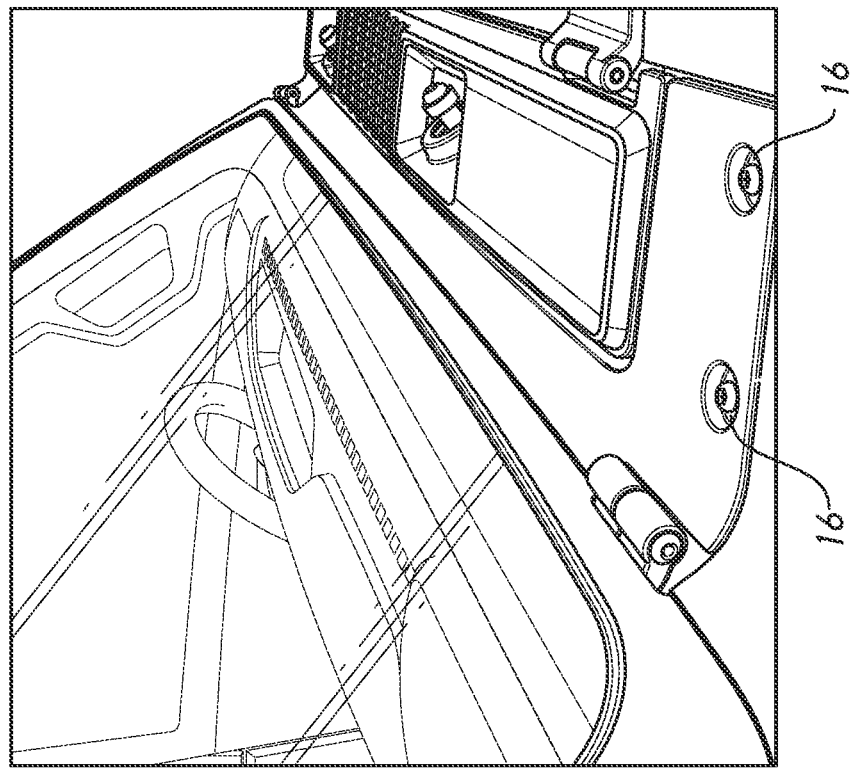

FIGS. 1, 2A, and 2B illustrate an embodiment of a light mount assembly 100 mounted on an embodiment of a vehicle 10. The light mount assembly 100 can be assembled on any suitable vehicle 10, such as a Jeep Wrangler. The vehicle 10 can have a hood 12 and/or a foldable windshield 14. In some embodiments, including the illustrated embodiment, the light mount assembly 100 can be mounted or secured to the vehicle 10 using a plurality of pre-existing holes 16 in the vehicle 10. The pre-existing holes 16 in the vehicle 10 can be disposed between the hood 12 and the windshield 14 of the vehicle 10. In some embodiments, including the illustrated embodiment, drilling is not required in order to secure the light mount assembly 100 to the vehicle 10. In some embodiments, holes can be drilled in the vehicle 10 as part of the assembling the light mount assembly 100. The light mount assembly 100 can have a first light 120 and a support 102 defining a track 110. The first light 120 can have a light mount 122 (FIG. 5A) that engages the track 110 in the support 102.

FIGS. 2A and 2B illustrate pre-existing holes 16 in the vehicle 10. In some embodiments, including the illustrated embodiment, the pre-existing holes 16 can be disposed on a portion of the vehicle 10 between the hood 12 and the windshield 14. The pre-existing holes 16 can be disposed on a top surface and/or a side surface of the vehicle 10. The top surface of the vehicle 10 can be a surface of the vehicle 10 that is adjacent to the windshield 14 and parallel with a ground when the vehicle 10 is on a horizontal surface. The side surface of the vehicle 10 is a surface of the vehicle 10 to the outboard of the adjacent side of the windshield. In some embodiments, the light mount assembly 100 can be configured to mate with the vehicle 10 by utilizing the pre-existing holes 16 in the vehicle 10. For example, in some embodiments, including the illustrated embodiment, the support 102 includes four apertures 112 that correspond with, and are configured to align with, four pre-existing holes 16 in the vehicle 10. In some embodiments, pre-existing fasteners, such as bolts, secure pre-existing vehicle components, such as cowls, to the vehicle 10 using the pre-existing holes 16. The pre-existing fasteners can be removed from the vehicle and re-purposed to secure not only the pre-existing vehicle component, but also the light mount assembly 100 to the vehicle 10. This is advantageous as it reduces the number of additional parts needed to assemble the light mount assembly 100, ensures the compatibility of the light mount assembly 100 with the vehicle 10, and reduces the likelihood of damage to the vehicle 10.

Figure 3C:
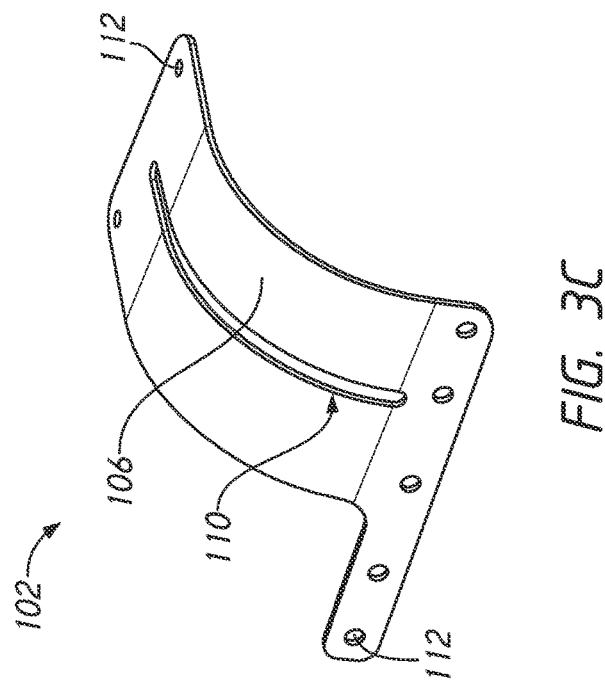
FIGS. 3A, 3B, and 3C show perspective views of an embodiment of a support defining a track.
Figure 3A:
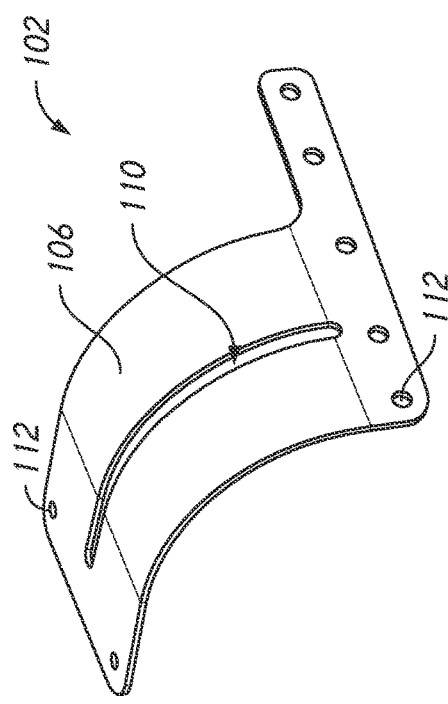
Figure 3B:
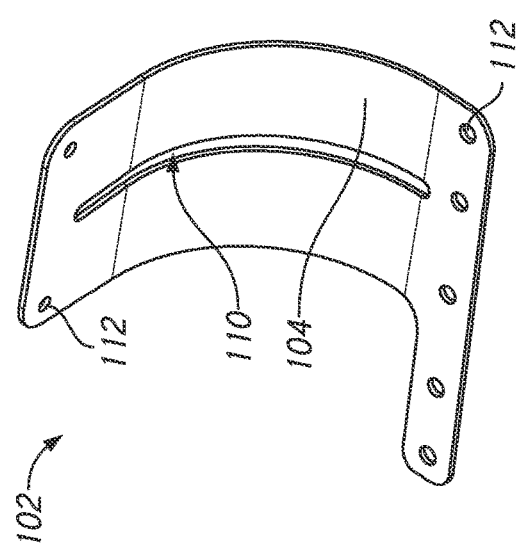
Figure 6:
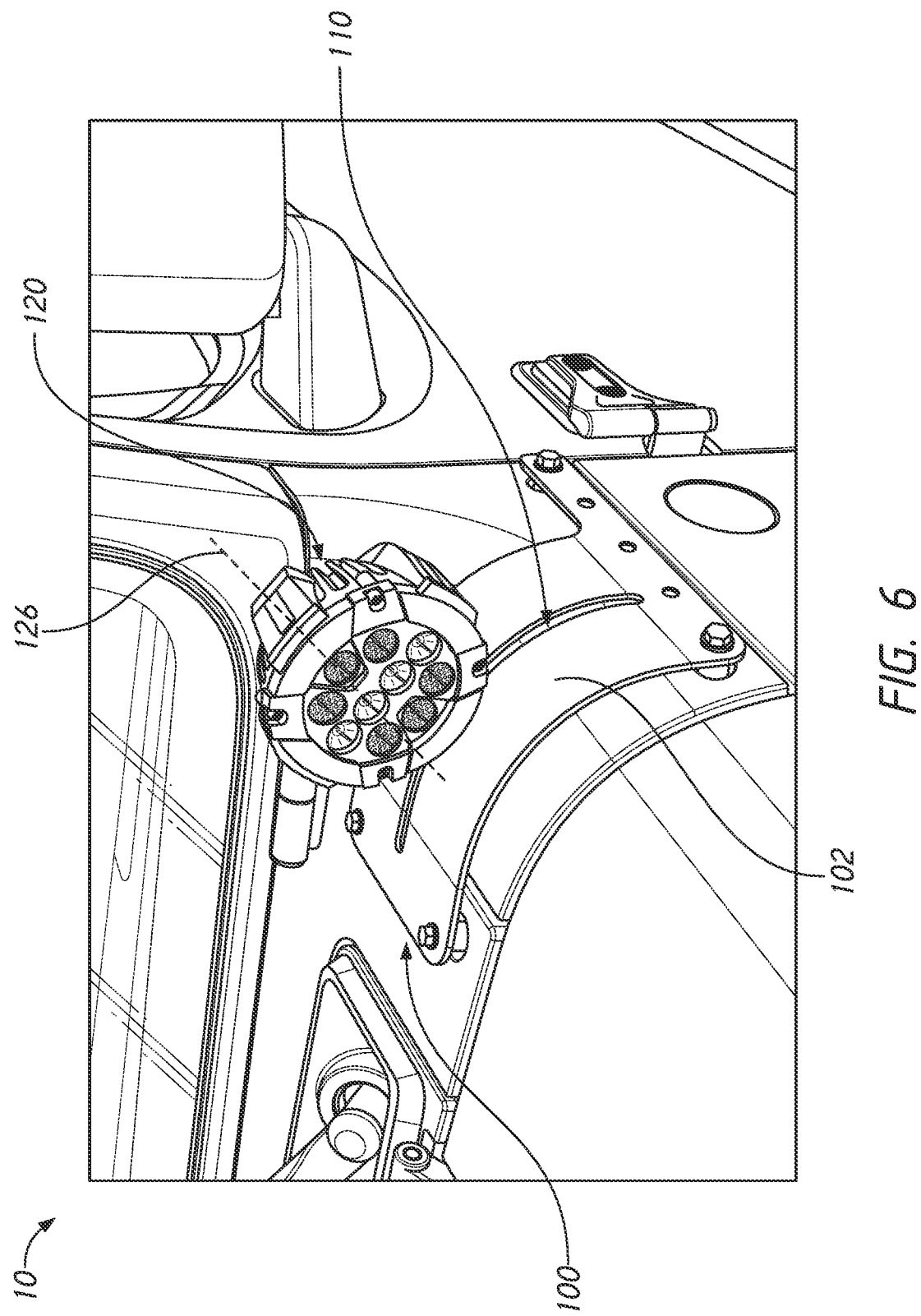
FIG. 6 shows another perspective view of the light mount assembly of FIG. 1 mounted on the vehicle.
Figure 7A:
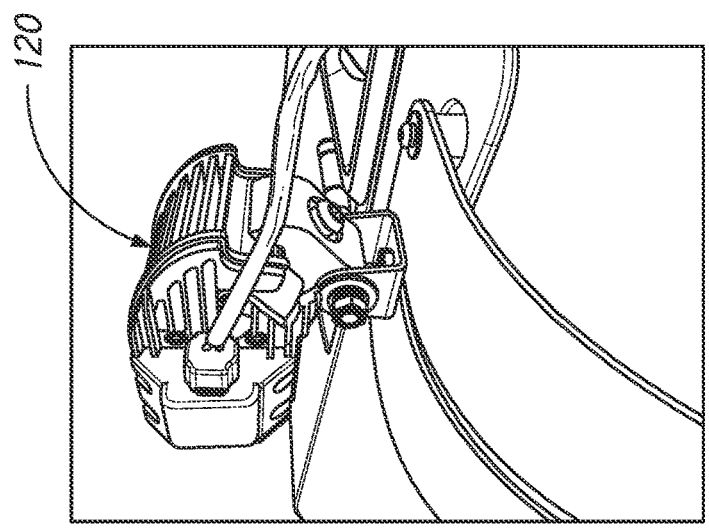
FIGS. 7A, 7B, and 7C show an embodiment of a light mount assembly with the light in different positions.
Figure 7B:
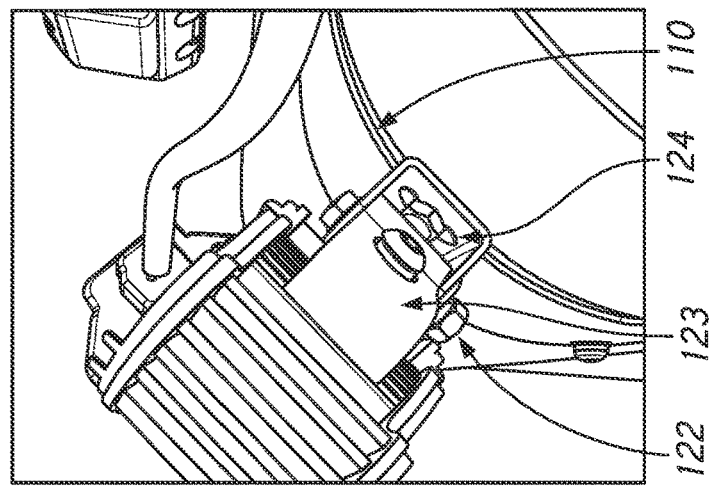
Figure 7C:
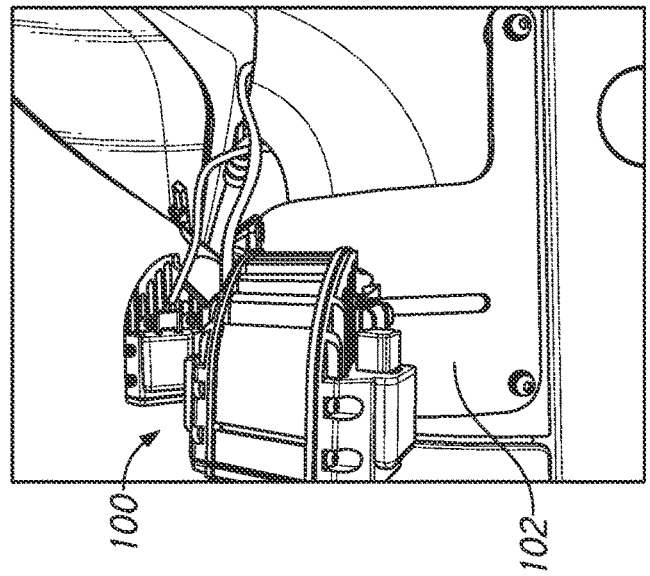

FIGS. 3A, 3B, and 3C show an embodiment of a support 102. In some embodiments, the support 102 can define a track 110. The track 110 can be one or more channels, gaps, slots, or other suitable structures configured to engage a light mount 122 of a first light 120. As illustrated in FIGS. 4A and 4B, the track 110 can define a first end 108 above a top surface of the vehicle 10 and a second end 109 to a side of the vehicle 10. The support 102 can have an inner surface 104 and an outer surface 106. The inner surface 104 of the support 102 can face the vehicle finish when the support 102 is mounted on the vehicle 10. The outer surface 106 of the support 102 can face away from the vehicle finish when the support 102 is mounted on the vehicle. In some embodiments, including the illustrated embodiment, the support 102 can have a plurality of apertures 112. At least some of the apertures 112 can be configured to align with and be compatible with pre-existing holes 16 on the vehicle 10. For example, in some embodiments, including the illustrated embodiment, two apertures 112 along one edge of the support 102 and two apertures 112 along an opposing edge of the support 102 can align with two pre-existing holes 16 on a top surface of the vehicle 10 and two pre-existing holes 16 on a lateral side of the vehicle 10, respectively.

Figure 8:
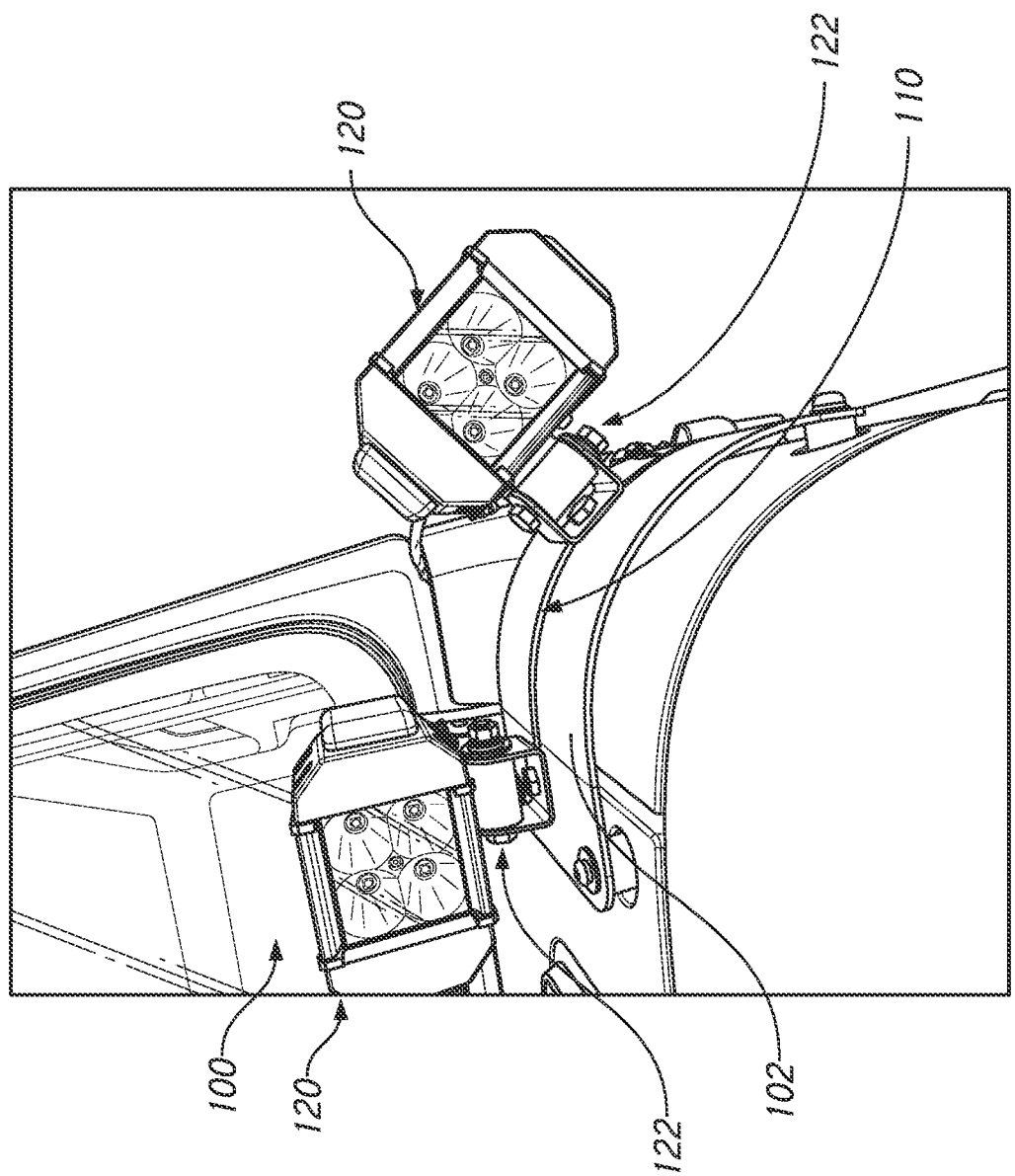
FIG. 8 shows an embodiment of a light mount assembly with multiple lights.

In some embodiments, at least some of the apertures 112 can be configured to engage a light. For example, in some embodiments, some of the apertures 112 along the bottom edge of the support 102 can engage lights. In some embodiments, the support 102 can hold multiple lights. For example, in some embodiments, a first light 120 engages the track 110 of the support 102 and a second or additional light engages an aperture 112 in the support 102. In some embodiments, the track 110 can hold multiple lights (FIG. 8). The first light 120 and the second or additional light can each be adjustable (e.g., slidable, rotatable, pivotable, etc.). For example, the first light 120 can be adjustable within the track 110 and/or relative to the support 102. In some embodiments, the first light 120 can pivot about an axis 126 extending through the track 110 and/or about a horizontal axis. In some embodiments, the first light 120 can move to any position along the track 110. For example, in some embodiments, including the illustrated embodiment, the first light 120 can move from a position above a top surface of the vehicle 10 to a position along the side of the vehicle 10 and/or to any position in between. In some embodiments, the direction of the face of the first light 120 can be rotatable relative to the vehicle 10 and/or the support 102. In some embodiments, a second or additional light can be adjustable within the aperture 112. For example, in some embodiments the direction of the face of the additional light can be rotatable relative to the vehicle 10 and/or the support 102.

The support 102 can be configured in various ways. In some embodiments, as illustrated in FIGS. 3A-3C, the support 102 can be a curved plate. The support 102 can be a single component or comprised of multiple components. The support 102 can be made of a hard material (e.g., steel) and/or can be soft or made of a resilient material (e.g., rubber). In some embodiments, the support 102 can be coated in a finish, such as a black powder-coated finish. The support 102 can be configured to conform to the curvature of the vehicle 10. The support 102 can protect components of the vehicle 10 disposed beneath it. For example, when the front doors on the vehicle 10 are opened, the doors and/or the side mirrors that are coupled to the doors can swing into and contact a portion of the vehicle that is forward of the vehicle's front doors, such as the vehicle's hood 12 and/or cowl. The support 102 can advantageously protect the surfaces of the vehicle 10 that come into contact when a portion of the door or the side mirror hits a portion of the hood 12 and/or cowl. For example, the support 102 desirably forms a shield which can create a barrier between the door or the side mirror and the portion of the vehicle 10 that is forward of the vehicle's front doors, thereby preventing damage to the vehicle 10 such as scratching, paint chipping, and/or denting of the hood 12, cowl, doors, and/or side mirrors. When assembled on the vehicle 10, the support 102 can contact the vehicle 10, such as at end points on the support 102, or can be spaced from the vehicle 10. For example, in some embodiments, including the illustrated embodiment, a cushioning layer 116, such as washers, can be disposed between the support 102 and the vehicle 10. This can advantageously prevent a support 102 made of a hard material from damaging the finish of the vehicle 10 and/or reduce the potential for noise while the vehicle 10 is moving.

FIGS. 4A and 4B illustrate the support 102 fixed to the vehicle 10. In some embodiments, the light mount assembly 100 can include at least four mounting points. For example, the support 102 can be fixed to the vehicle 10 at four points. The support 102 can be bolted to pre-existing holes 16 in the vehicle 10 using fasteners 114. The fasteners 114 can be pre-existing fasteners that are already located on the vehicle 10 and re-purposed to additionally secure the support 102 to the vehicle 10 and/or fasteners that are compatible with the pre-existing holes 16 in the vehicle 10.

The fasteners 114 can extend from the outer surface 106 of the support 102 to the inner surface 104 of the support, and further extend into the pre-existing holes 16 in the vehicle. A cushioning layer 116 can be disposed between the inner surface 104 of the support 102 and the finish of the vehicle 10. For example, as illustrated in FIG. 4A, in some embodiments, a fastener 114 can contact the outer surface 106 of the support 102 and a corresponding washer can contact the inner surface 104 of the support 102. The support 102 can directly and/or indirectly contact an outer surface of the vehicle 10. In some embodiments, a portion of the support 102 is spaced from the outer surface of the vehicle 10. For example, as shown in FIG. 4A, there can be a gap between the outer surface of the vehicle 10 and the inner surface 104 of at least a portion of the support 102. This can advantageously allow the base of the light mount 122 to be spaced from the outer surface of the vehicle 10 when coupled to the track 110 such that the first light 120 can slide along the track 110.

FIGS. 5A and 5B show embodiments of a first light 120. In some embodiments, including the illustrated embodiment, the first light 120 can have a light mount 122 with an upper portion 123 and a base portion 124 and a longitudinal axis 126. The light mount 122 can be configured to mate with the track 110 in the support 102. In some embodiments, the light mount 122 can be configured to engage the apertures 112 in the support 102. The light mount 122 can be a post, a screw, or any other suitable mounting structure.

Figure 10:
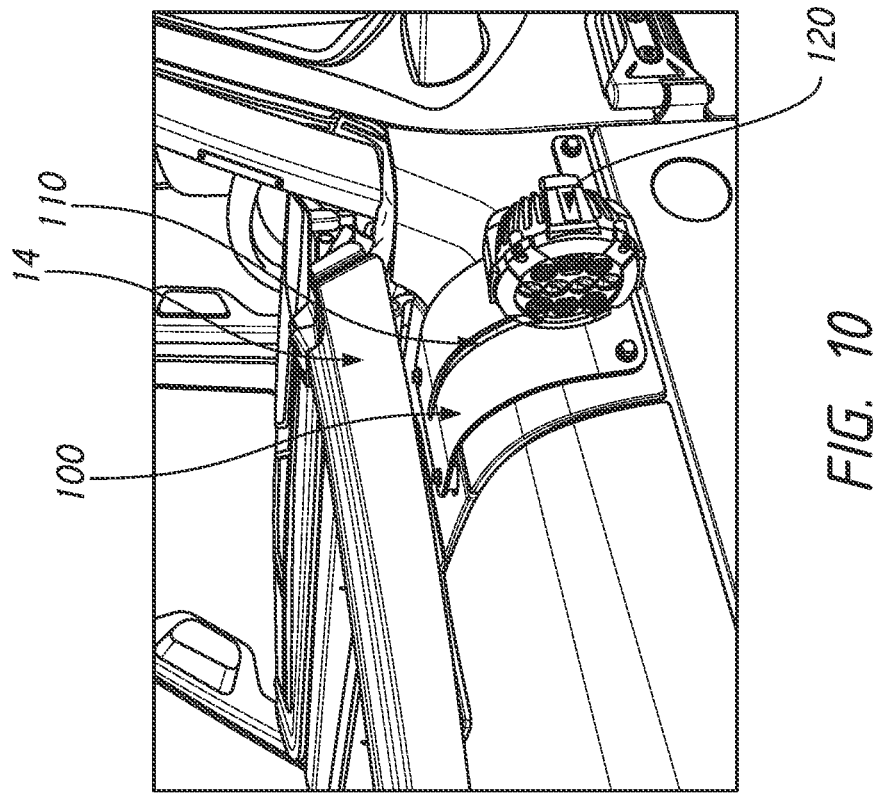
FIG. 10 shows a perspective view of the light mount assembly of FIG. 1 mounted on the vehicle.
Figure 9:
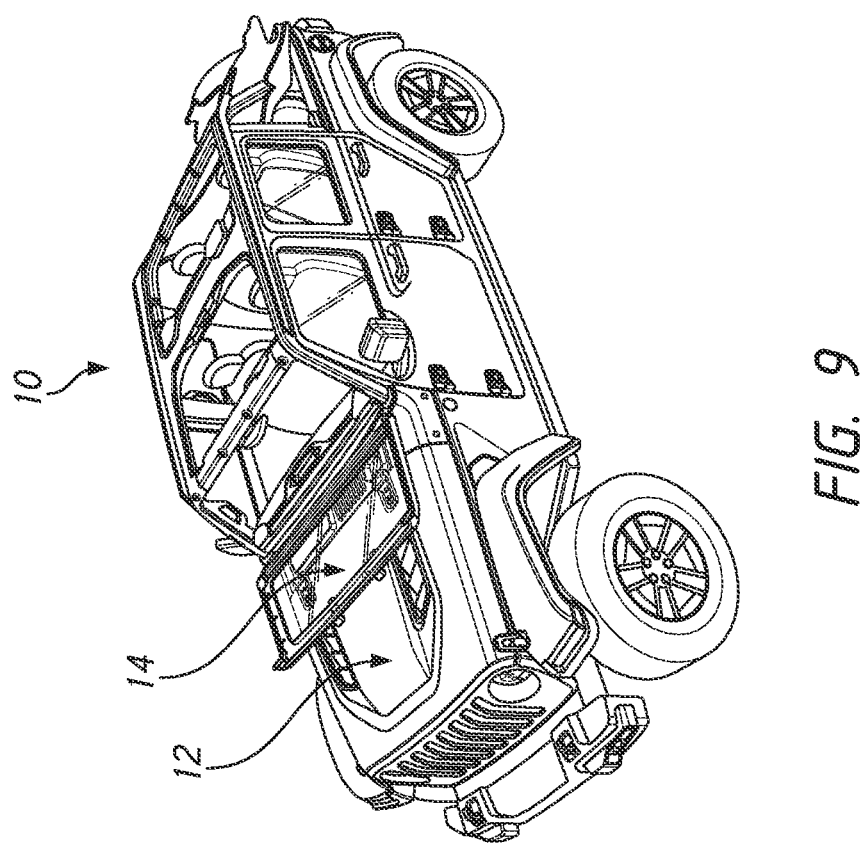
FIG. 9 shows an embodiment of a vehicle with a foldable windshield.

FIGS. 6-10 illustrate the ability of the first light 120 and/or a second or additional light to traverse the track 110 on the support 102. The first light 120 can be repositioned in different configurations, such as in different orientations and/or locations with respect to the vehicle 10 and/or the support 102. In some embodiments, as shown in FIG. 8, multiple lights can engage and slide along the track 110. As shown in FIGS. 9 and 10, the vehicle 10 can have a foldable windshield 14 with a raised position and a lowered position. The light mount assembly 100 can be configured such that the first light 120 can be positioned above a top surface of the vehicle 10 when the windshield 14 is raised or upright and can be repositioned along a side surface of the vehicle 10 when the windshield 14 is folded down or lowered. In some embodiments, the track 110 can define a first location under the lowered position of the windshield 14 and a second location spaced to the side of the lowered position of the windshield 14. In some embodiments, the first location can correspond to the first end 108 of the track 110. In some embodiments, the second location can correspond to the second end 109 of the track 110. This can advantageously prevent the first light 120 from interfering with the windshield 14 when the windshield 14 is in the lowered position or being moved to the lowered position. In some embodiments, the axis 126 of the light mount 122 can be transverse to a first portion of the support 102 defining a first position and transverse to a second portion of the support 102 defining a second position, the axis 126 in the first position being transverse to the axis 126 in the second position.

From the foregoing description, it will be appreciated that inventive light mount assemblies and related methods are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations and/or "some embodiments" can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A vehicle having a hood, a windshield, and a light mount assembly, the light mount assembly comprising:
   a light having a light mount with an upper portion and a base portion; and
   a support defining a track, the support having an inner surface and an outer surface, the light being coupled to the track;
   wherein the vehicle further comprises pre-existing holes on a portion of the vehicle between the hood and the windshield, the support having apertures aligning with the pre-existing holes on the vehicle; and
   wherein the support is mounted on the vehicle such that the base portion of the light mount is spaced from an outer surface of the vehicle.

2. The vehicle of claim 1, further comprising fasteners securing the support to the outer surface of the vehicle, the fasteners extending through the apertures in the support and into the pre-existing holes on the vehicle.

3. The vehicle of claim 1, further comprising a cushioning layer between the support and the outer surface of the vehicle.

4. The vehicle of claim 1, wherein the track defines a first end above a top surface of the vehicle and a second end to a side of the vehicle.

5. The vehicle of claim 4, wherein the light mount and the track cooperate to permit the light to move relative to the support between the first end and the second end of the track.

6. The vehicle of claim 4, wherein the windshield of the vehicle is foldable, the windshield having a raised position and a lowered position, wherein the track defines a first location under the lowered position of the windshield and a second location spaced to the side of the lowered position of the windshield.

7. The vehicle of claim 6, wherein the first location and the second location are disposed between the first and the second ends of the track.

8. The vehicle of claim 1, wherein the light mount is slidable within the track.

9. The vehicle of claim 1, wherein the support contacts the outer surface of the vehicle.

10. The vehicle of claim 1, wherein the support comprises a resilient material.

11. The vehicle of claim 1, wherein the support conforms to a curvature of the vehicle.

12. A light mount assembly, comprising:
    a light having a light mount defining an axis, an upper portion, and a base portion;
    a support defining a track with a first end and a second end and having an inner surface and an outer surface, wherein the support comprises a plurality of apertures configured to align with pre-existing holes on a vehicle between a hood and a windshield of the vehicle, the support being configured to attach to an outer surface of the vehicle such that the base portion of the light mount is spaced from the outer surface of the vehicle; and
    wherein when the light is coupled to the track, the light mount and the track cooperate to permit the light to move relative to the support between the first end and the second end of the track.

13. The assembly of claim 12, wherein the axis of the light mount is transverse to a first portion of the support defining a first position and transverse to a second portion of the support defining a second position, the axis in the first position being transverse to the axis in the second position.

14. The assembly of claim 12, wherein the first end of the track is configured to be positioned above a top surface of the vehicle and the second end of the track is configured to be positioned to a side of the vehicle.

15. The assembly of claim 12, further comprising fasteners configured to secure the support to the outer surface of the vehicle, the fasteners configured to extend through the plurality of apertures in the support and into pre-existing holes on the vehicle.

16. The assembly of claim 12, wherein the track is configured to define a first location under a lowered position of a windshield of the vehicle and a second location spaced to a side of the lowered position of the windshield.

17. The assembly of claim 12, wherein the support is configured to contact the outer surface of the vehicle.

18. The assembly of claim 12, wherein the support comprises a resilient material.

19. The assembly of claim 12, wherein the support is configured to conform to a curvature of the vehicle.

20. The assembly of claim 12, wherein the light is configured to rotate relative to the support.

21. A vehicle having a hood, a windshield, and a light mount assembly, the light mount assembly comprising:
   a light having a light mount with an upper portion and a base portion; and
   a support defining a track, the support having an inner surface and an outer surface, the light being coupled to the track;
   wherein the support is mounted on the vehicle such that the base portion of the light mount is spaced from an outer surface of the vehicle, the track defining a first end above a top surface of the vehicle and a second end to a side of the vehicle; and
   wherein the windshield of the vehicle is foldable, the windshield having a raised position and a lowered position, wherein the track defines a first location under the lowered position of the windshield and a second location spaced to the side of the lowered position of the windshield.

22. The vehicle of claim 21, wherein the light mount and the track cooperate to permit the light to move relative to the support between the first end and the second end of the track.

23. The vehicle of claim 21, wherein the support conforms to a curvature of the vehicle.

24. A light mount assembly, comprising:
   a light having a light mount defining an axis, an upper portion, and a base portion;
   a support defining a track with a first end and a second end and having an inner surface and an outer surface, the support being configured to attach to an outer surface of a vehicle such that the base portion of the light mount is spaced from the outer surface of the vehicle;
   wherein the track is configured to define a first location under a lowered position of a windshield of the vehicle and a second location spaced to a side of the lowered position of the windshield; and
   wherein when the light is coupled to the track, the light mount and the track cooperate to permit the light to move relative to the support between the first end and the second end of the track.

25. The assembly of claim 24, wherein the axis of the light mount is transverse to a first portion of the support defining a first position and transverse to a second portion of the support defining a second position, the axis in the first position being transverse to the axis in the second position.

26. The assembly of claim 24, wherein the support is configured to conform to a curvature of the vehicle.

\* \* \* \* \*